(12) United States Patent
Nunberg et al.

(10) Patent No.: US 9,397,932 B2
(45) Date of Patent: Jul. 19, 2016

(54) SYSTEMS AND METHODS FOR ROUTING NETWORK INFORMATION

(75) Inventors: Mordechai Nunberg, Minden, NV (US); Kristopher Kubicki, Chicago, IL (US)

(73) Assignee: Reno Acquisitions, LLC, Saratoga Springs, NY (US)

( * ) Notice: Subject to any disclaimer, the term of this patent is extended or adjusted under 35 U.S.C. 154(b) by 1066 days.

(21) Appl. No.: 13/355,101

(22) Filed: Jan. 20, 2012

(65) Prior Publication Data

US 2013/0185455 A1    Jul. 18, 2013

Related U.S. Application Data

(60) Provisional application No. 61/587,551, filed on Jan. 17, 2012.

(51) Int. Cl.
*G06F 15/16* (2006.01)
*G06F 15/173* (2006.01)
*H04L 12/725* (2013.01)
*H04L 29/08* (2006.01)

(52) U.S. Cl.
CPC .............. *H04L 45/306* (2013.01); *H04L 67/02* (2013.01); *H04L 67/2823* (2013.01)

(58) Field of Classification Search
CPC ....... H04L 12/58; H04L 12/585; H04L 51/00; H04L 51/12; H04L 51/22; H04L 51/32; H04L 63/0227; H04L 63/0245; H04L 65/1079; G06Q 10/10
USPC ........................................................ 709/238
See application file for complete search history.

(56) References Cited

U.S. PATENT DOCUMENTS

| | | | | |
|---|---|---|---|---|
| 6,115,384 A * | 9/2000 | Parzych | ........................ | 370/401 |
| 6,360,262 B1 * | 3/2002 | Guenthner et al. | ............ | 709/226 |
| 7,526,572 B2 * | 4/2009 | Omar et al. | ..................... | 709/246 |
| 7,590,759 B2 * | 9/2009 | Omar et al. | ..................... | 709/246 |
| 7,694,011 B2 * | 4/2010 | O'Rourke et al. | ............ | 709/238 |
| 7,962,644 B1 * | 6/2011 | Ezerzer et al. | ................ | 709/238 |
| 7,970,923 B2 * | 6/2011 | Pedersen et al. | ............. | 709/231 |
| 8,073,777 B2 * | 12/2011 | Barry et al. | ..................... | 705/50 |
| 8,176,186 B2 * | 5/2012 | McCanne et al. | ............. | 709/228 |
| 8,200,775 B2 * | 6/2012 | Moore | .......................... | 709/217 |
| 8,549,155 B2 * | 10/2013 | Skog et al. | ..................... | 709/228 |
| 8,724,654 B2 * | 5/2014 | Sinh Thakur et al. | ......... | 370/466 |
| 8,805,339 B2 * | 8/2014 | Ramer et al. | ............... | 455/414.1 |
| 8,819,045 B2 * | 8/2014 | Dhulipala et al. | ............ | 707/758 |
| 8,862,660 B1 * | 10/2014 | Fausak et al. | ................ | 709/203 |
| 2010/0246509 A1 * | 9/2010 | Chen | ............................ | 370/329 |
| 2014/0344345 A1 * | 11/2014 | Venkatraman et al. | ........ | 709/203 |
| 2014/0344891 A1 * | 11/2014 | Mullick et al. | ..................... | 726/1 |

* cited by examiner

*Primary Examiner* — Melvin H Pollack
(74) *Attorney, Agent, or Firm* — Nixon Peabody LLP (57) ABSTRACT

A network routing system is described herein. The network routing system comprises a traffic router and a plurality of proxy gateways. The traffic router is configured to receive at least one request for a network object from a requester. The request includes a network address of a target web host. One or more proxy servers from a plurality of proxy servers are assigned to each proxy gateway. In operation, if there is a proxy server having a current connection with the target web host, the traffic router selects the proxy server and forwards the request to a proxy gateway that the proxy server is assigned to. In operation, the proxy gateway receives the request for the network object, converts the request into a translated request based on a protocol type of the proxy server, and sends the translated request to the proxy server.

31 Claims, 5 Drawing Sheets

Route history database 202

| Proxy \ Host | 132 | 134 | 136 |
|---|---|---|---|
| 122 | 2 | 5 | 0 |
| 124 | 3 | 3 | 2 |
| 126 | 1 | 4 | 2 |

Current load database 204

| Proxy | Current connections | Expired connections |
|---|---|---|
| 122 | 1 | 7 |
| 124 | 2 | 8 |
| 126 | 2 | 7 |

SYSTEMS AND METHODS FOR ROUTING NETWORK INFORMATION

PRIORITY CLAIM

This application claims priority to U.S. Provisional Patent Application No. 61/587,551, entitled "Systems and Methods for Routing Network Information", which was filed on Jan. 17, 2012, the contents of which are expressly incorporated by reference herein.

BACKGROUND

The Internet is a world wide system of computer networks. One of the most popular parts of the Internet is the World Wide Web ("www"), which contains hypermedia content accessible to tens of millions of people worldwide. The hypermedia content is usually organized as web pages formatted by the Hypertext Markup Language ("HTML"). The HTML documents, i.e., web pages, and other media are transmitted from web servers through the networks using the Hypertext Transfer Protocol ("HTTP"). The web page contains embedded references to resources such as images, audio, video, documents, or other web pages. By selecting "hyperlinks" or "links" on the web page, a user can access resources that are embedded in the web page being browsed.

Web pages can be either static or dynamic. A static web page contains fixed content and the content is not changing according to any user requests. A dynamic web page contains dynamically-generated content. Based on a user's request, a web server can return a dynamic web page containing content that dynamically generated from information stored in a database. Because of the large number of web pages and web servers on the Internet, information is often poorly organized. It can be difficult for users to locate particular web pages that contain information interesting to them. There are search engines and other web-based intelligent service systems developed to go through a large number of web pages to retrieve and organize the information. The engines and systems generally include at least one "miner process" (also referred to as "miner", "crawler", "spider", "robot") that fetches the web pages on different web sites as a means of retrieving up-to-date information.

To maintain the quality and freshness of the information that a system is organizing, it is common to utilize thousands of miner processes at any given time. Often the miner processes are fetching HTTP Content such as web pages, images and the like. It is common that there are concurrent fetches by different miners to the same website, trying to retrieving information from the same or different web pages. Each miner connects to a web site via at least a three-step negotiation process. The actual request from the miner for the content can only be issued after the negotiation process is complete. When used in conjunction with many requests for web pages, the negotiation process can cause a significant impact on the performance. The most common type of content fetched by miners is small content, such as a webpage or a small image. For these requests of small contents, there are usually only a single step for a request and another single step for a response after the 3-steps negotiation process. This means that the miner uses more network resources negotiating the connection than it does getting the content. If the miner communicates with the server using a secure connection, such as Secure Socket Layer ("SSL") or Hypertext Transfer Protocol Secure ("HTTPS"), even more network resources will be spent negotiating the connection.

Furthermore, some websites and servers try to block robotic requests including miner requests for various reasons, such as reducing number of connections to the web server, or a deliberate attempt to prevent the miner from retrieving a large amount of information from the web site. Currently very limited approaches can be employed to work around the blocking. These work-around approaches usually cause even slower and less efficient requests. Moreover, less efficient miner approach will use excessive amount of connections, resulting in an even higher likelihood of miner being blocked. Therefore, there is a need for an efficient approach of establishing and routing miner connections.

The foregoing examples of the related art and limitations related therewith are intended to be illustrative and not exclusive. Other limitations of the related art will become apparent upon a reading of the specification and a study of the drawings.

SUMMARY

Introduced herein is a network routing system. The network routing system comprises a traffic router and a plurality of proxy gateways. The traffic router is configured to receive at least one request for a network object from a requester. The request includes a network address of a target web host. One or more proxy servers from a plurality of proxy servers are assigned to each proxy gateway. In operation, if there is a proxy server having a current connection with the target web host, the traffic router selects the proxy server and forwards the request to a proxy gateway that the proxy server is assigned to. In operation, the proxy gateway receives the request for the network object, converts the request into a translated request based on a protocol type of the proxy server, and sends the translated request to the proxy server.

The system algorithmically selects the best connection for a given request to balance the connection loads. It aims to ensure that no single connection is too saturated and overloaded. Multiple requests may be sent through a current connection to reduce the connection overhead. The system enables network objection extraction through a large number of different proxies. In one embodiment, components of the system may be hosted on a distributed environment. This helps to ensure a high scalability and high availability by not requiring the system to be concentrated on a single machine. At least some components of the system are discreet and require no client-side configuration to function. Client may still provide extra optional preference parameters, but the parameters are not required.

This Summary is provided to introduce a selection of concepts in a simplified form that are further described below in the Detailed Description. This Summary is not intended to identify key features or essential features of the claimed subject matter, not is it intended to be used to limit the scope of the claimed subject matter.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

As used herein, a "requester" (also referred to as consumer) is an entity which requests an object via a network protocol such as HTTP. When the consumer wishes to get an object such as a web page, the requester is represented by one or more miner.

As used herein, a "request" is an act of requesting an object via a network protocol such as HTTP.

As used herein, a "route" is a network path used to fetch an object via a network protocol such as HTTP. It is characterized by having a distinct IP address as its source, and has the effects of making requests using this route appearing and having originated from this route's IP. The IP of the route is not necessarily the IP directly used by a consumer, but every requester's request eventually ends up passing through a route.

As used herein, a "web host" (also referred to as origin server) represents a server on the internet to which a request issued by a requester reaches through a route. In some embodiments, the web host may a web server belonging to a manufacturer or vendor which is crawled or connected by the miner.

As used herein, a "request pairing" (also referred to as "request set" or "RS") represents a transient pairing between an origin server and an available route. Request pairings are transient in that they may not be used after a specific amount of time elapsed, and that they are to be invalidated after they are used for a specific amount of times. Whenever a requester wishes to issue an object request to an web host, a check is made to see if a request pairing exists for the request destination; i.e., whether a route exists for this request. If a route exists, the route is used, and the request pairing's counter is decremented; if one does not exist yet, the database is queried and algorithmically produces an available request pairing.

Figure 1:
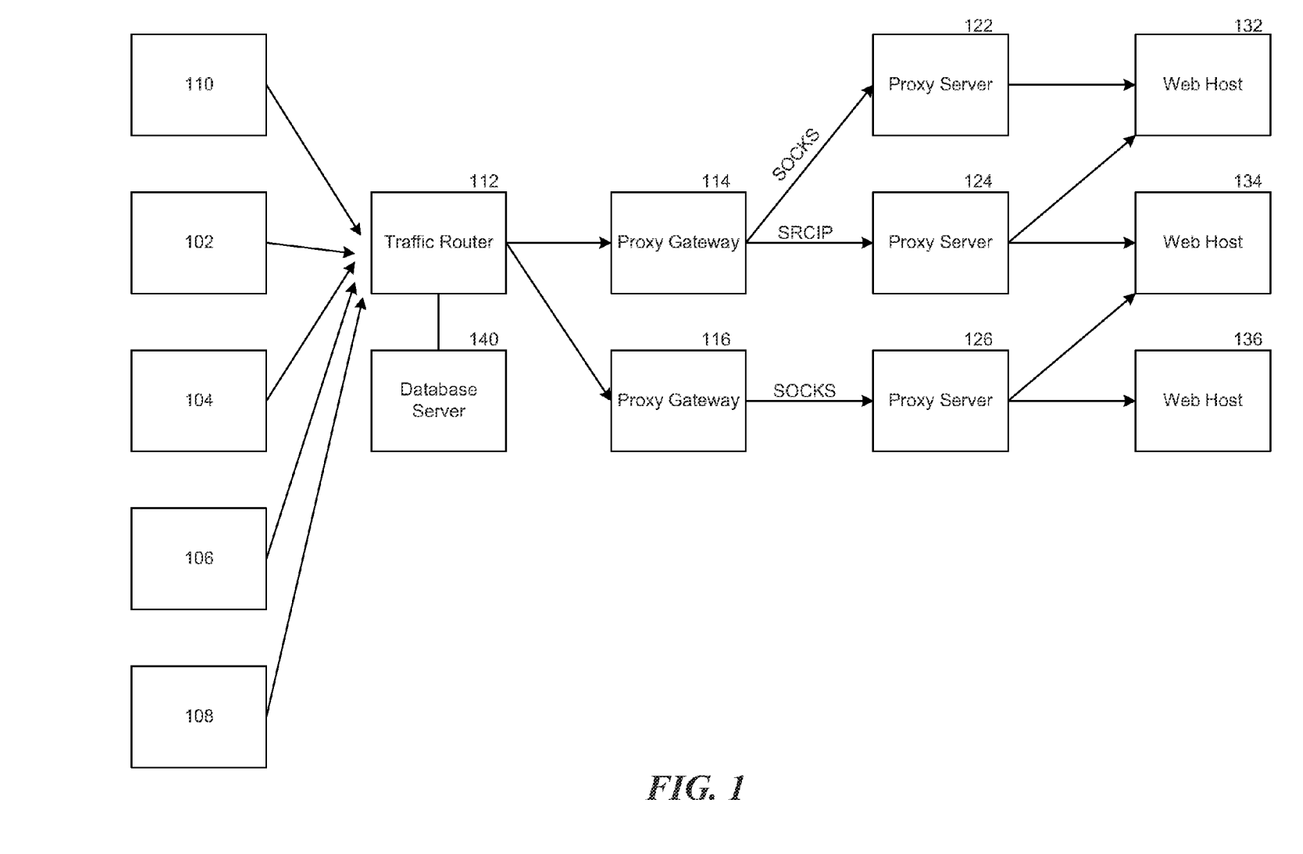
FIG. 1 illustrates an example of a network routing system for fetching network objects.

FIG. 1 illustrates an example of a network routing system for fetching network objects. A system according to one embodiment of the disclosure utilizes at least one traffic router (112), to leverage centralized, global connections from requesters such as a plurality of miners (102, 104, 106, 108, and 110) with concurrent requests. For example, the number of miners may be several thousands. In one embodiment, each miner may be a computer or a process running on a computer. Each miner sends one or more requests, such as an HTTP request, for fetching network objects from one or more target web hosts (132, 134, and 136) through the Internet. A network address, such as a URL, is included in the request. A web host may be any HTTP web server, such as an HTTP web server for a manufacturer or a vendor. A network object may comprises a text, a web page, an image, an HTML file, a CSS file, a JavaScript file, an audio, a video, or content-less HTTP control messages.

The traffic router 112 receives the requests from the miners (102, 104, 106, 108, 110), and selects a proxy server for processing the request among a plurality of available proxy servers (122, 124, 126). If there is a current connection between an available proxy server and the target web host, the traffic router selects this proxy server having the current connection for the request. In this case, the traffic router utilizes an existing connection (route) to the target web host for fetching the network object without the need of initiating a new connection. If there is no current connection between the target web host and any available proxy server, the traffic selects a proxy server to initiate a new connection between the proxy server and the target web host.

The selection of proxy server for the new connection is based on two principles. First, the route history between the target web host and each proxy server is considered. For a web host and a proxy server, the route history is defined as a number of expired connections between the web host and the proxy server. The route histories between different web hosts and different proxy servers are tracked and recorded in a route history database. The proxy server has the least route history with the target host is preferred for initiating the new connection. Thus, the chance of one or more particular proxy servers frequently connecting to the same target host is minimized. The target host will receive connections from different proxy servers so that no particular proxy server is suspected or blocked.

Second, the current load of each proxy server is also considered. For each proxy server, the current load is defined as a total number of the proxy server's current connections with all web hosts. The current load of each proxy server is tracked and recorded in a current load database. The proxy server having the least current load, i.e., the proxy server having the smallest number of current connections, is preferred for initiating new connection. Therefore, the burden of the proxy servers tends to be spread evenly; and chance of overusing any particular proxy server is minimized.

Each proxy server may be different in terms of authentication mode and communication protocol. For example, each proxy server may have different authentication mode and/or different username, password or other credentials. Furthermore, a proxy server may require receiving requests in different protocols, such as VPN, SOCKS, SRCIP, L2TP or HTTP. The network object requests received by the traffic router are usually requests using the HTTP protocol. In order to facilitate a uniform usage framework and hide the complexity of different proxy servers, the system includes a plurality of proxy gateways (114, 116) that are responsible of dealing with the proxy servers. Each proxy gateway is responsible to initiate the connections and maintain keep-alive connections with one or more proxy servers assigned to the proxy gateway. For example, FIG. 1 shows that proxy servers 122 and 124 are assigned to proxy gateway 114, and proxy server 126 is assigned to proxy gateway 116. Once the traffic router 112 selects a proxy server for the request, the request is forwarded to the corresponding proxy gateway which the selected proxy server is assigned to. The proxy gateway determines which protocol the selected proxy server requires, and converts the request into a translated request based on the protocol type of the selected proxy server. For example, if the proxy server 126 is selected, the proxy gateway 116 may convert the original HTTP request for a network object, into a SOCKS request for the network object that the selected proxy server 126 is able to receive and process. The translated request is sent to the selected proxy server to instruct the selected proxy server to retrieve the network object from the target host.

Figure 2:
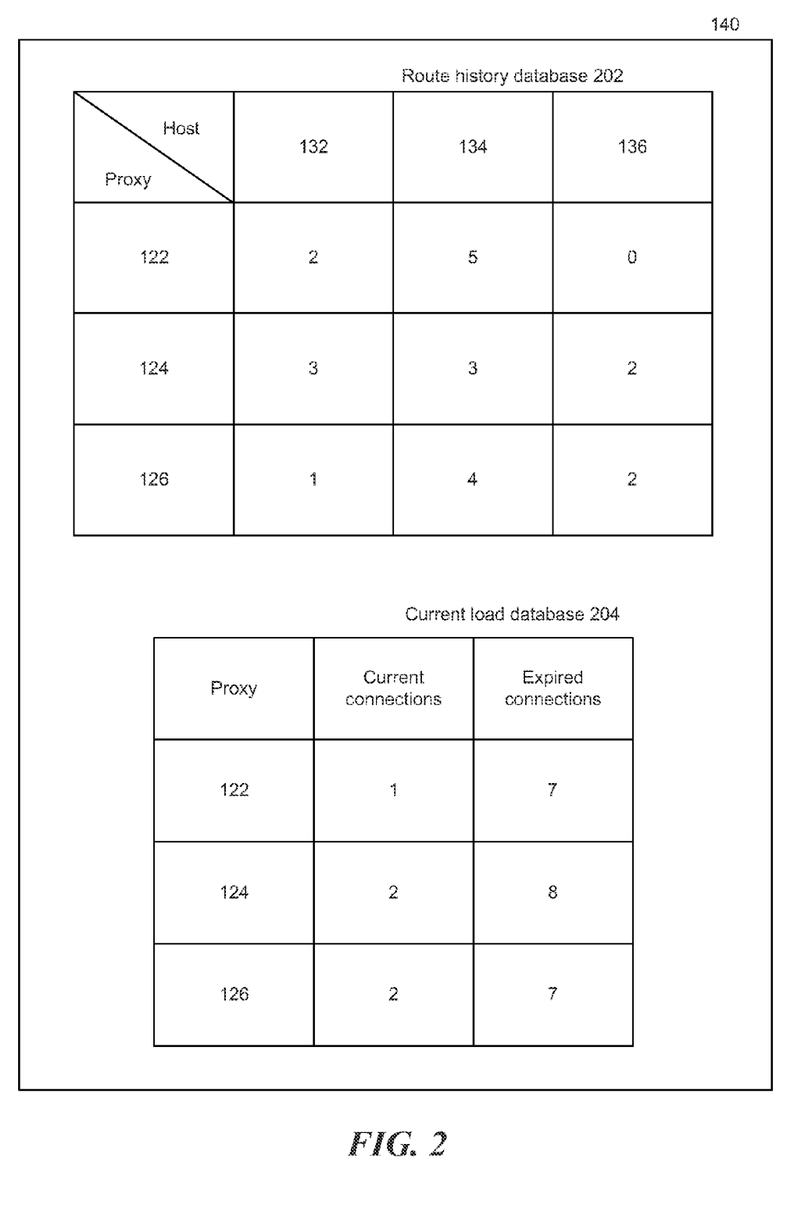
FIG. 2 illustrates an example of a database server.

In one embodiment, the system includes a database server 140. FIG. 2 illustrates an example of the database server 140. The Database Server may be an external process, or it may be embedded into the traffic router 112. There may be several traffic routers connected to the same shared database. The database server 140 may include a route history database 202. The route history database 202 records numbers of expired connections between proxy servers and web hosts. Connections, or routes, are transient in a way that they may not be available after a period of time. This may be caused by various reasons, such as keep-alive connection being expired, target host being overloaded or down, proxy server being overloaded or down, and proxy server being blocked. For example, as recorded by the route history database 202 in FIG. 2, the number of expired connections (also referred to as past connections or expired routes) between proxy server 122 and web host 134 is 5.

The database server 140 may further include a current load database 204. In the current load database 204, the number of current connections for each available proxy server is tracked and recorded. For example, FIG. 2 shows proxy server 124 has two current connections with any web hosts. In one embodiment, the current load database 204 may further record the number of expired connections for each available proxy server. In another embodiment, the expired connection entries in the current load database 204 are updated and calculated based on the route history database 202. In some embodiments, the database server may operate as a cluster.

In some embodiments, the proxy gateways and the traffic router are running on a distributed cluster of nodes. In one embodiment, some of the proxy gateways and the traffic router are the processes running on a commonly shared computer. In another embodiment, the proxy gateways and the traffic router run on separated computers interconnected by the networks.

In one embodiment, third-party proxy servers are utilized to retrieve the network object. For example, a proxy server receives a request in a secured SOCKS5 protocol with authorization, and accordingly sends HTTP requests to a target web host for one or more network objects. In one embodiment, the proxy server is instructed by the proxy gateway to maintain a HTTP keep-alive connection (also referred to as HTTP persistent connection, or HTTP connection reuse) to the target host. Therefore, as opposed to initiating a new connection for each request, multiple HTTP requests and responses are transmitted in a single connection between the target web host and the proxy server.

The system allows for multiple connection methods to reduce the risk of blocking. The connection methods mask the true origins of the requests and cause the web server to regard the requests as originated from regular users, instead of miners or robots. A non-homogeneous process is utilized to provide a uniform framework to manage these connection methods with different usage constraints.

The system algorithmically selects the best connection for a given request to balance the connection loads. It aims to ensure that no single connection is too saturated and overloaded, since saturation increases the risk of being blocked or banned for requests by a web server. In one embodiment, the system is further able to monitor and verify connection paths, take appropriate action in the event of failure, and create new connections on the fly when they become available. In another embodiment, the proxy server can also act as a cache server maintaining a local cache of served requests, thereby reducing or eliminating network traffic for data that is already retrieved. In one embodiment, components of the system may be hosted on a distributed environment. This helps to ensure scalability and high availability by not requiring the system to be concentrated on a single machine. At least some components of the system are discreet and require no client-side configuration to function. Clients may still provide extra optional preference parameters, but these parameters are not required.

Figure 3:
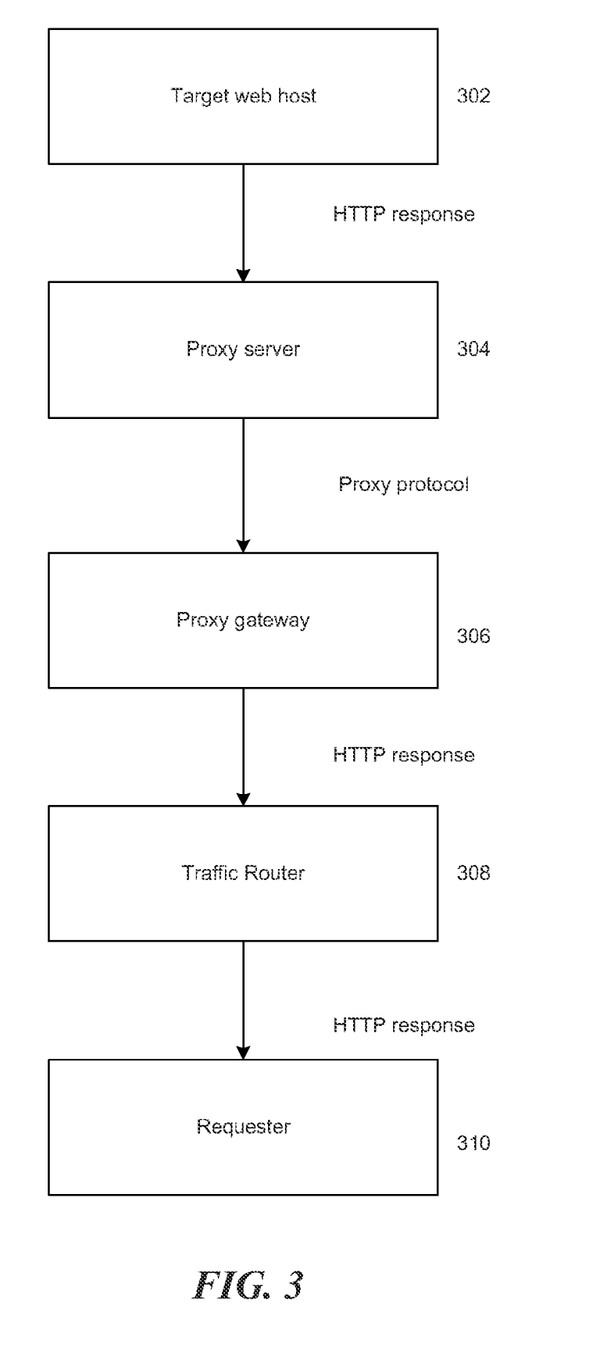
FIG. 3 illustrates an example of a route replaying a response from a web host to a requester.

Once the request for the network object is received by a proxy server. The proxy server generates an HTTP request. If there is a current connection between the proxy server and the target web host, the proxy server sends the HTTP request through the current connection. If there is no current connection between the proxy server and the target web host, the proxy server initiates a connection with the target web host, and then sends the HTTP request trough the connection. If the network object is located in the target web host, the web host sends back an HTTP response containing an instance of the network object. In one embodiment, the response is relayed back as illustrated in FIG. 3. For example, the proxy server 304 receives the HTTP response through a keep-alive connection from target web host 302, then sends a response based on the protocol type of the proxy server to proxy gateway 306. Proxy gateway 306 translates the response from the protocol of proxy server to the protocol of traffic router, i.e., HTTP. The translated HTTP response is sent to traffic router 308. The traffic router 308 discovers who is the requester and sends the response containing the instance of the network object to the requester 310.

Figure 4:
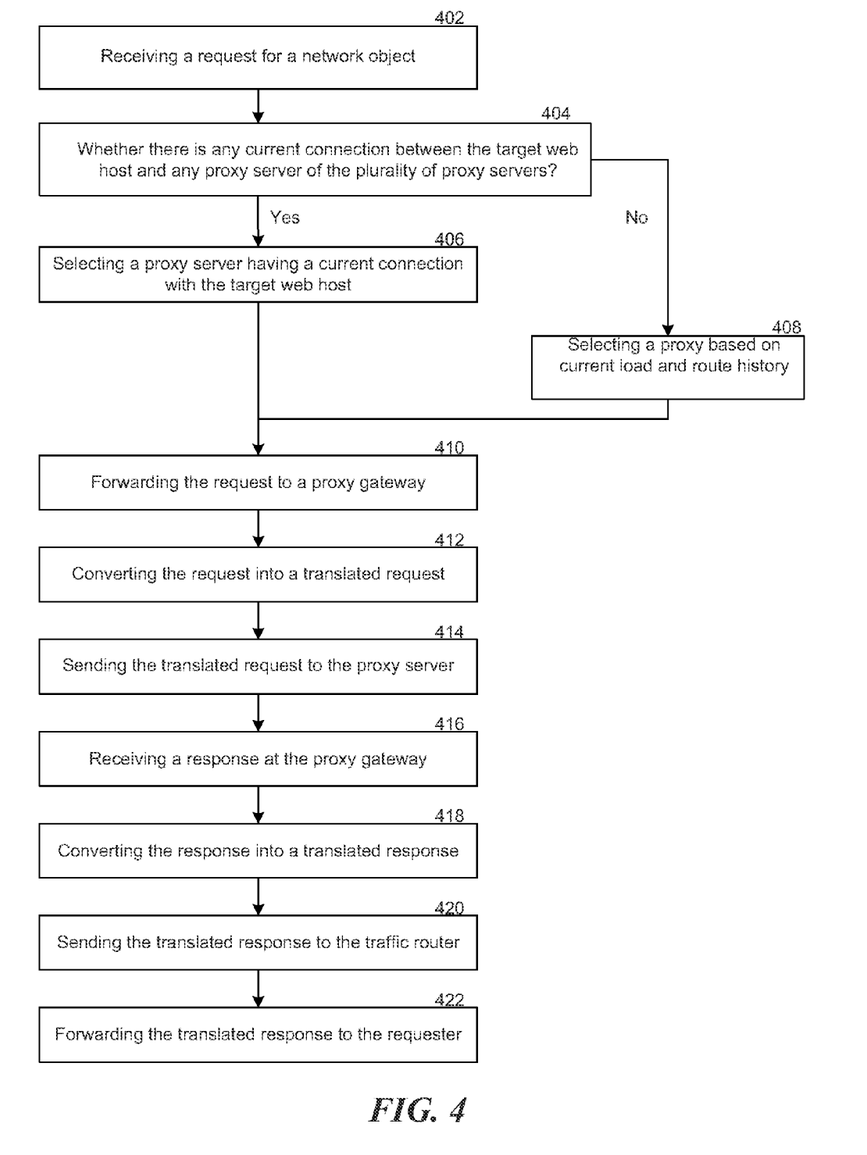
FIG. 4 illustrates an example of a process for routing network information.

FIG. 4 illustrates an example of a process for routing network information. At step of 402, traffic router receives at least one request for a network object. The request for a network object includes a network address of a target web host. Next at 404, the traffic router determines whether there is any current connection between the target web host and any proxy server of the plurality of proxy servers. Then if there is a proxy server having a current connection with the target web host, the proxy server is selected at 406. If none of the plurality of proxy servers has current connections with the target web host, the traffic router selects a proxy server from the plurality of proxy servers based on a current load for each proxy server and a route history between each proxy server and the target web host at 408. Then at 410, the request for the network object is forwarded to a proxy gateway of a plurality of proxy gateways, wherein the proxy server is assigned to the proxy gateway. The proxy gateway receives the request for the network object and converts the request for the network object into a translated request based on a protocol type of the proxy server (412). The translated request is sent to the selected proxy server (414). Once the requested network object is retrieved through the connection by the selected proxy server, a response containing an instance of the network object based on the protocol type of the proxy server from the proxy server is received by the proxy gateway (416). At 418, the proxy gateway converts the response into a translated response based on a protocol type of the traffic router, such as HTTP. The translated response is sent to the traffic router (420). The traffic router discovers who is the requester and forwards the translated response to the requester (422).

The traffic router and proxy gateways disclosed in the embodiments may be any devices that have network communication abilities and processing powers to model or synthesize the video. The traffic router and gateways may be any computer or group of computers that each has network communication abilities and storage capability to store the databases.

Figure 5:
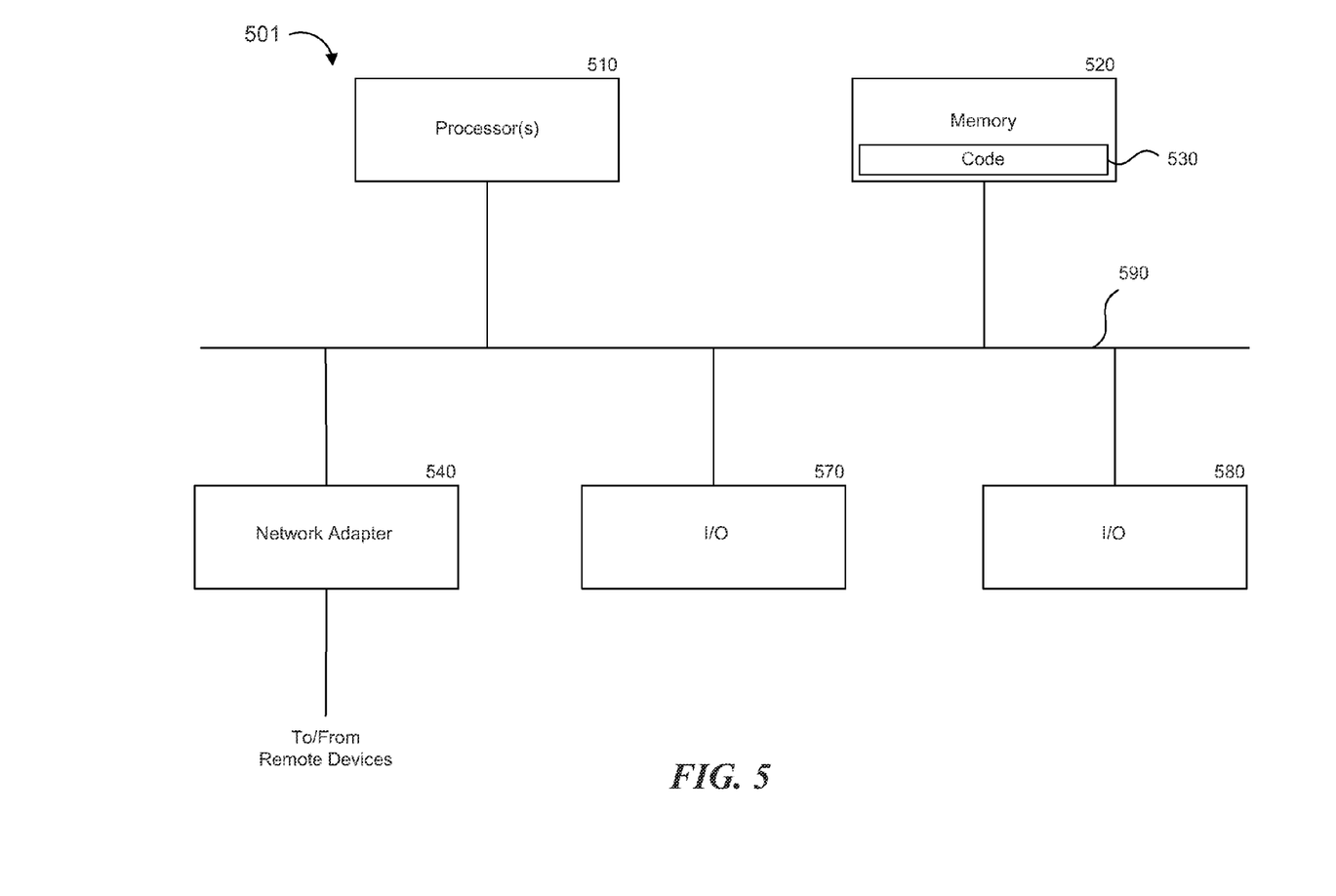
FIG. 5 is a block diagram of a processing system that can be used to implement a traffic router or a proxy gateway implementing the techniques described herein.

FIG. 5 is a block diagram of a processing system that can be used to implement any of the techniques described above, as a traffic router or a proxy gateway or both. Note that in certain embodiments, at least some of the components illustrated in FIG. 5 may be distributed between two or more physically separate but connected computing platforms or boxes. The processing can represent a conventional server-class computer, PC, mobile communication device (e.g., smartphone), or any other known or conventional processing/communication device.

The processing system 501 shown in FIG. 5 includes one or more processors 510, i.e., a central processing unit (CPU), memory 520, at least one communication device 540 such as an Ethernet adapter and/or wireless communication subsystem (e.g., cellular, WiFi, Bluetooth or the like), and one or more I/O devices 570, 580, all coupled to each other through an interconnect 590.

The processor(s) 510 control(s) the operation of the computer system 501 and may be or include one or more programmable general-purpose or special-purpose microprocessors, microcontrollers, application specific integrated circuits (ASICs), programmable logic devices (PLDs), or a combination of such devices. The interconnect 590 can include one or more buses, direct connections and/or other types of physical connections, and may include various bridges, controllers and/or adapters such as are well-known in the art. The interconnect 590 further may include a "system bus", which may be connected through one or more adapters to one or more expansion buses, such as a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The memory 520 may be or include one or more memory devices of one or more types, such as read-only memory (ROM), random access memory (RAM), flash memory, disk drives, etc. The network adapter 540 is a device suitable for enabling the processing system 1101 to communicate data with a remote processing system over a communication link, and may be, for example, a conventional telephone modem, a wireless modem, a Digital Subscriber Line (DSL) modem, a cable modem, a radio transceiver, a satellite transceiver, an Ethernet adapter, or the like. The I/O devices 570, 580 may include, for example, one or more devices such as: a pointing device such as a mouse, trackball, joystick, touchpad, or the like; a keyboard; a microphone with speech recognition interface; audio speakers; a display device; etc. Note, however, that such I/O devices may be unnecessary in a system that operates exclusively as a server and provides no direct user interface, as is the case with the server in at least some embodiments. Other variations upon the illustrated set of components can be implemented in a manner consistent with the invention.

Software and/or firmware 530 to program the processor(s) 510 to carry out actions described above may be stored in memory 520. In certain embodiments, such software or firmware may be initially provided to the computer system 501 by downloading it from a remote system through the computer system 501 (e.g., via network adapter 540).

The techniques introduced above can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A network routing system, comprising:
a traffic router configured to receive at least one request for a network object from a requester, the request including a network address of a target web host;
a plurality of proxy gateways, one or more proxy servers from a plurality of proxy servers being assigned to each proxy gateway of the plurality of proxy gateways;
wherein the traffic router is configured to determine if any of the plurality of proxy servers has a previously established connection with the target web host, and if so, to forward the request for the network object to a proxy gateway that the proxy server having a previously established connection to the target web host is assigned to; and
wherein the proxy gateway is configured to receive the request for the network object from the traffic router, convert the request for the network object into a translated request based on a protocol type of the proxy server, and send the translated request to the proxy server.

2. The network routing system of claim 1,
wherein, in operation, if none of the plurality of proxy servers has a previously established connection with the target web host, the traffic router is configured to select a proxy server from the plurality of proxy servers based on a current load for each proxy server and a route history between each proxy server and the target web host; and
wherein, in operation, the proxy gateway is configured to instruct the proxy server to initiate a connection with the target web host.

3. The network routing system of claim 1,
wherein the proxy gateway is configured to receive a response having an instance of the network object based on the protocol type of the proxy server from the proxy server, convert the response into a translated response based on a protocol type of the traffic router, and send the translated response to the traffic router;
wherein the instance of the network object is fetched from the target web host through the previously established connection by the proxy server; and
wherein, the traffic router is configured to receive the translated response, and forward the translated response to the requester.

4. The network routing system of claim 2,
wherein, for each web host and each proxy server of the plurality of proxy servers, the route history is a number of expired connections between said web host and said proxy server.

5. The network routing system of claim 2,
wherein, for each proxy server of the plurality of proxy servers, the current load is a number of current connections between said proxy server and web hosts.

6. The network routing system of claim 2,
wherein, if none of the plurality of proxy servers has previously established connections with the target web host, the traffic router is configured to select a proxy server from the plurality of proxy servers, and the selected proxy server has the least current load and the least route history with the target web host.

7. The network routing system of claim 1,
further comprising a database server having a route history database,
wherein, for each web host and each proxy server of the plurality of proxy servers, the route history database recording a number of expired connections between said web host and said proxy server.

8. The network routing system of claim 1, wherein the network object comprises a text, a web page, an image, an HTML file, a CSS file, a JavaScript file, an audio, a video, or content-less HTTP control messages.

9. The network routing system of claim 1, wherein the requester is a computer or a process running on a computer.

10. The network routing system of claim 1, wherein the target web host is an HTTP web server.

11. The network routing system of claim 1, wherein the protocol type of the proxy server is HTTP, VPN, SRCIP, SOCKS, or L2TP.

12. The network routing system of claim 3, wherein the protocol type of the traffic router is HTTP.

13. The network routing system of claim 1, wherein, in operation, the proxy gateway initiates a connection to the proxy server based on the protocol type of the proxy server.

14. The network routing system of claim 1, wherein, in operation, the proxy gateway signs on and initiates a connection to the proxy server based on an authentication mode and the protocol type of the proxy server.

15. The network routing system of claim 1, wherein, in operation, the proxy gateway maintains a keep-alive connection to the proxy server.

16. The network routing system of claim 1, wherein, in operation, the proxy gateway instructs the proxy server to maintain a keep-alive connection to the target web host.

17. The network routing system of claim 1, wherein at least one proxy gateway of the plurality of proxy gateways runs on a separated computer from the computer that the traffic router runs on.

18. The network routing system of claim 1, wherein at least one proxy gateway of the plurality of proxy gateways and the traffic router runs on a commonly shared computer.

19. The network routing system of claim 1, wherein the traffic router is further configured to concurrently receive a plurality of requests for network objects from a plurality of requesters, select a proxy server for each request of the plurality of requests, and forward each request to a proxy gateway that said proxy server is assigned to.

20. The network routing system of claim 1, wherein the traffic router is further configured to maintain a cache for network objects from previous requests.

21. The network routing system of claim 7, wherein the database server and the traffic router run on a commonly shared computer.

22. The network routing system of claim 1, wherein the proxy gateway further instructs the proxy server to maintain a cache for network objects from previous requests.

23. A method for routing network information, comprising:
receiving at a traffic router, at least one request for a network object, the request for a network object including a network address of a target web host;
determining by the traffic router whether there is any previously established connection between the target web host and any proxy server of a plurality of proxy servers;
selecting a proxy server having a previously established connection with the target web host;

forwarding the request for the network object to a proxy gateway of a plurality of proxy gateways that is assigned to the selected proxy server;

receiving the request for the network object from the traffic router at the proxy gateway;

converting the request for the network object into a translated request based on a protocol type of the selected proxy server; and sending the translated request to the proxy gateway to the selected proxy server.

24. The method of claim 23, further comprising:

selecting a proxy server from the plurality of proxy servers based on a current load for each proxy server and a route history between each proxy server and the target web host if none of the plurality of proxy servers has previously established connections with the target web host; and instructing the proxy server to initiate a connection with the target web host.

25. The method of claim 23, further comprising:

receiving at the proxy gateway a response having an instance of the network object based on the protocol type of the selected proxy server from the proxy server;

converting the response into a translated response based on a protocol type of the traffic router;

sending the translated response to the traffic router; and forwarding the translated response to the requester.

26. The method of claim 25, wherein the instance of the network object is fetched from the target web host through the previously established connection by the proxy server.

27. The method of claim 24, wherein, for each web host and each proxy server of the plurality of proxy servers, the route history is a number of expired connections between said web host and said proxy server.

28. The method of claim 24, wherein, for each proxy server of the plurality of proxy servers, the current load is a number of current connections between said proxy server and all web hosts.

29. The method of claim 28 wherein if none of the proxy servers has a previously established connection with the target web host, the selected proxy server is a proxy server that has the least current load and the least route history with the target web host, among the plurality of proxy servers.

30. The method of claim 29, further comprising:

initiating a connection from the proxy gateway to the selected proxy server.

31. The method of claim 30, further comprising:

instructing the selected proxy server to maintain a keep-alive connection to the target web host.

* * * * *